(12) United States Patent
Eryurtlu

(10) Patent No.: US 7,191,389 B1
(45) Date of Patent: Mar. 13, 2007

(54) VIDEO SIGNAL ERROR DETECTION SYSTEMS

(75) Inventor: Faruk Mehmet Omer Eryurtlu, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/069,686

(22) PCT Filed: May 15, 2000

(86) PCT No.: PCT/GB00/01844

§ 371 (c)(1),
(2), (4) Date: Feb. 22, 2002

(87) PCT Pub. No.: WO01/17271

PCT Pub. Date: Mar. 8, 2001

(30) Foreign Application Priority Data

Aug. 31, 1999 (EP) .................................. 99306911

(51) Int. Cl.
G06F 7/02 (2006.01)
H03M 13/00 (2006.01)

(52) U.S. Cl. ...................................... 714/819
(58) Field of Classification Search ................ 714/819
See application file for complete search history.

(56) References Cited

U.S. PATENT DOCUMENTS 4,498,104 A    2/1985   Schulz
5,488,618 A    1/1996   Kondo
5,627,590 A    5/1997   Hamano
5,767,898 A *  6/1998   Urano et al. .................. 348/43

FOREIGN PATENT DOCUMENTS

WO    WO 95/03674    2/1995

* cited by examiner

*Primary Examiner*—Joseph D. Torres

(57) ABSTRACT

Mobile phones now transmit video signals at relatively slow bit rates. The signals transmitted are compressed using inter-frame prediction where sufficient similarity exists between successive picture frames. The receiver includes a decoder which reconstitutes the compressed signals received using signals stored on a buffer representing a previous picture frame. A mode decision circuit compares the signal at the output of the decoder with the previous signal stored and using the same decision criterion as used for the original compression generates a signal which indicates that either the signal is suitable for inter-frame prediction or not. This signal is then compared with the signal from the encoder indicating whether or not the current signal was inter-frame predicted or not. If equality is not detected, then an error may have taken place. Then, error concealment techniques are used.

6 Claims, 2 Drawing Sheets

VIDEO SIGNAL ERROR DETECTION SYSTEMS

The present invention relates to video signal error detection systems.

Mobile phones now have the facility to transmit and receive video signals so that the communicating parties can view each other while speaking.

Because of restricted bandwidths, the signals are transmitted at low bit rates. Because mobile phone networks are now so extensive and the transmission medium is air, the transmitted signals are more susceptible to corruption, for example, due to channel errors. Accordingly, there is a need to check received video signals for errors.

The video signals are usually transmitted in a succession of successive macroblocks. Each macroblock may comprise a block of 16×16 pixels of a picture frame. A simple error check may be carried out in the mobile phone receiving the signal, by counting the coefficients in the macroblock. In a 16×16 macroblock there will be a maximum of 256 coefficients and, if more are counted, it can be assumed that an error has occurred. In this event, the macroblock being received may be suppressed and replaced by the corresponding block in the previous frame or other error concealment techniques may be used.

However, other errors may not be so easy to detect.

It is an object of the invention to provide an improved video signal error detection system.

According to the present invention there is provided a video signal error detection system for use in a receiver having a decoder for receiving encoded video signals produced by an encoder in a transmitter, the encoder being selectively operative to transmit only differences between selected macroblocks in successive frames when a specific difference criteria between said successive blocks is not exceeded, the detection system comprising a first comparator for comparing macroblocks in successive frames in the output signal from said decoder, applying said specific difference criteria to provide an indication of whether inter-frame prediction should apply or not, and a second comparator for comparing the output from the first comparator with an output from the decoder indicative of whether or not the last macroblock received was in inter-frame prediction format or not and operable to generate an error signal when a divergence is detected.

The video signal error detection system embodying the present invention, will now be described, by way of example, with reference to the accompanying diagrammatic drawings in which.

Figure 1:
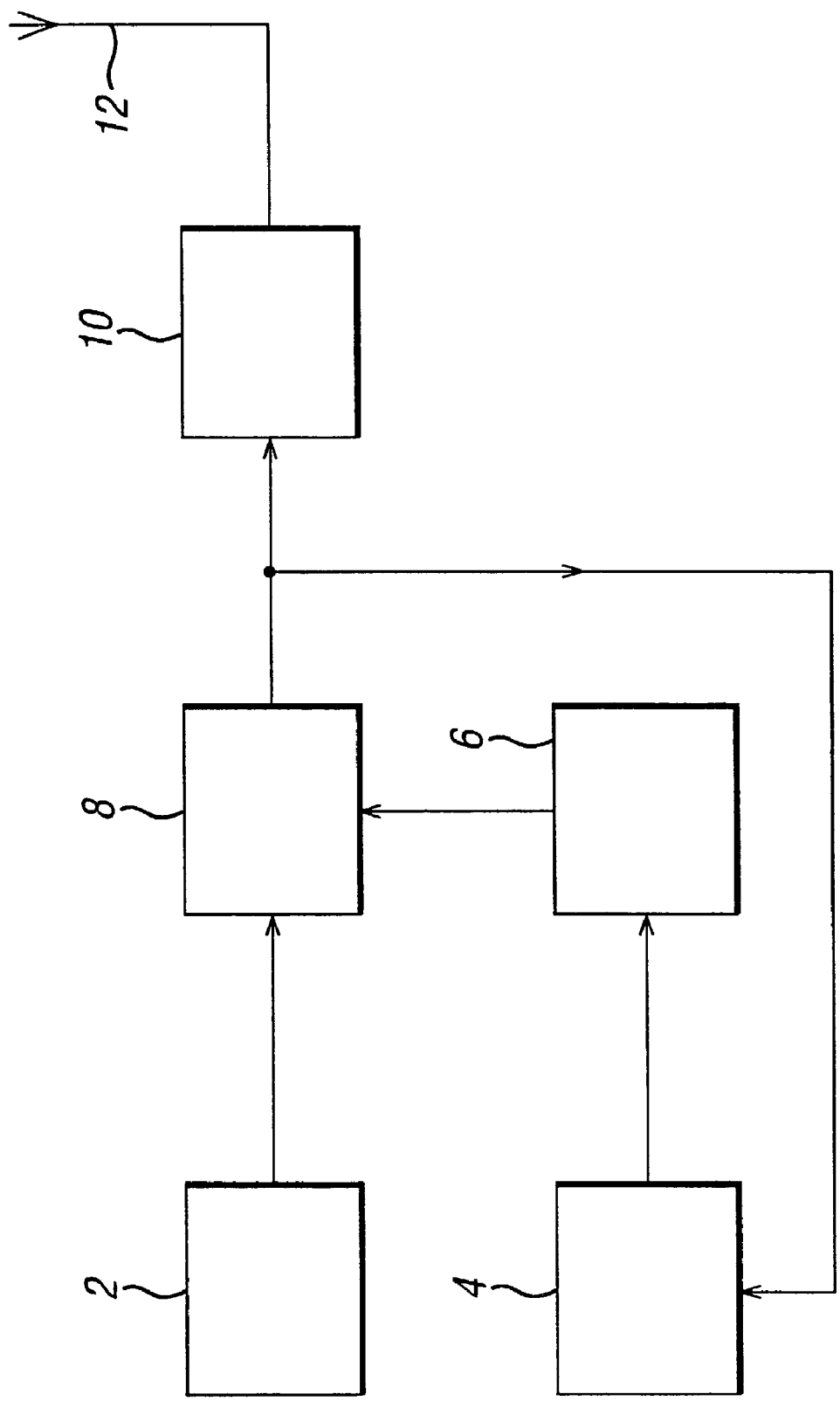
FIG. 1 is a block diagram of a video transmission system.

The video transmission system shown in FIG. 1 comprises a video camera 2 which generates a video output signal representative of a picture frame.

The output of the camera 2 is fed to an encoder 8. The output of the encoder 8 is fed via a delay circuit 4 to a buffer memory 6 and directly to a transmitter 10 which transmits the signal via an antenna 12 to a remote station. The encoder 8 compares the current picture frame signals being received from the camera 2 with the immediately preceding picture frame signals as stored in the buffer memory 6.

The encoder 8 exploits the correlation between successive frames. The current video coding standards use block matching motion compensation technique for inter-frame prediction. In this approach, if the current picture block is similar to another block in the previous frame (picture) within the search area, the displacement (motion) vector and the difference between those two blocks are encoded (INTER mode). Otherwise, the current picture is encoded without any inter-frame prediction (INTRA mode).

Each block, hereinafter called a macroblock, may comprise a 16×16 pixel block.

Figure 2:
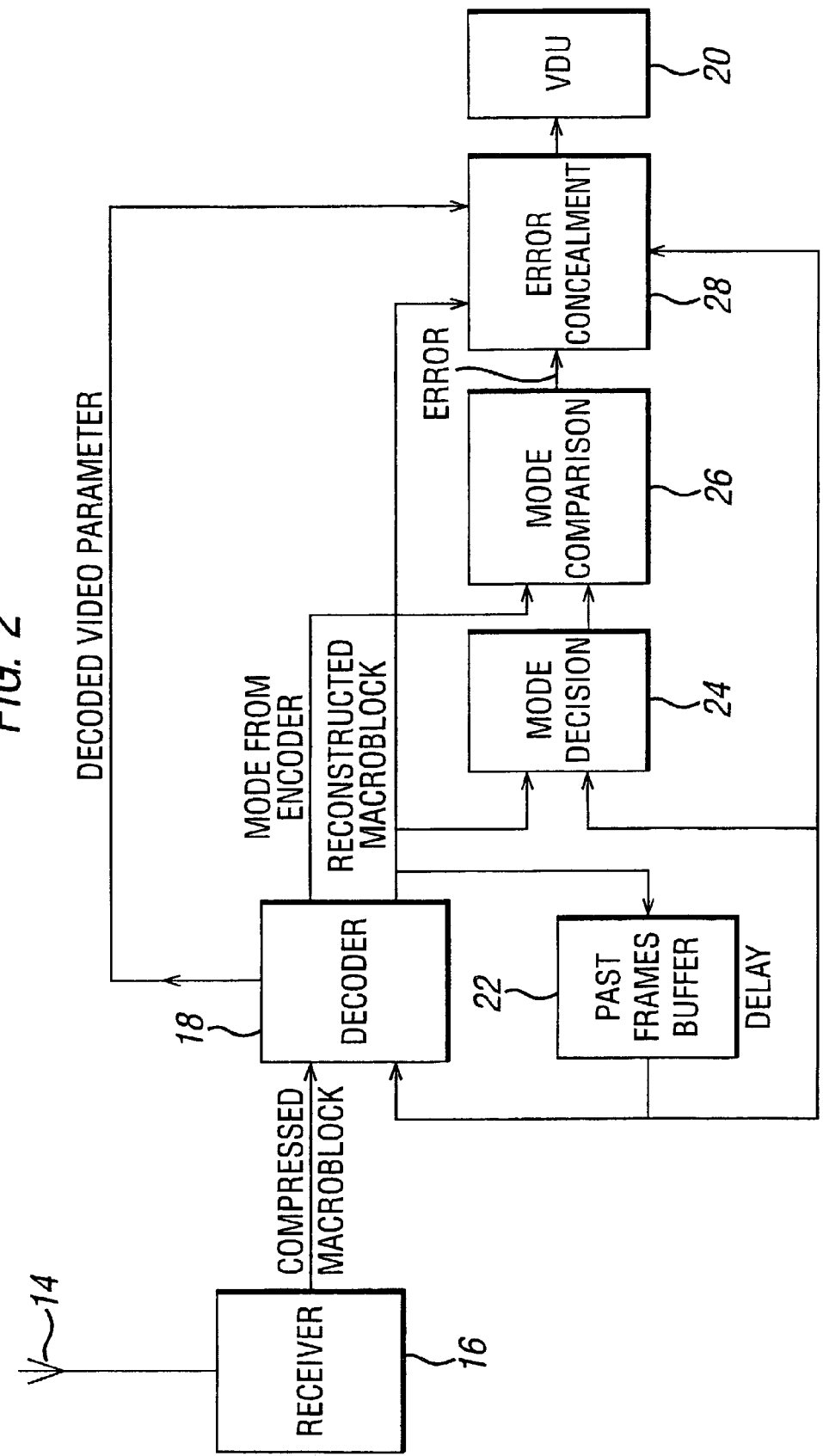
FIG. 2 is a block diagram of a video reception system.

The video reception system, shown in FIG. 2, includes an antenna 14 which feeds a receiver 16. The output of the receiver 16 is fed to a decoder 18. The decoder 18 decodes the bit stream which also includes a mode indicator signal from the receiver. This mode information is fed to a mode decision circuit 24. The reconstructed picture is fed to an error concealment circuit 28, and also to a buffer 22 so that the buffer 22 is always updated to provide the previous (the immediately preceding) picture frame.

The output of the error concealment circuit 28 is displayed on a visual display unit The mode decision circuit 24 responds to the output of the decoder 18 and the buffer 22 to carry out a similar decision making process to that carried out in the encoder 8 ie it tries to predict whether the two macroblocks being compared qualify for INTER or INTRA mode treatment. A comparison circuit 26 then compares the output of the decision circuit with the mode indicator from the decoder 18. If concordance is not detected, there is a strong possibility of error. The error concealment circuit 28 tries to recover corrupted data if an error indication is signalled from the comparison circuit 26, using established techniques.

The mode decision circuit 24 may be constructed in a manner similar to the video codec test model Version 8 (TMN8) described by Thomas R Gardos in the proceedings of the video coding experts group question 15 (Q15-A-59) Portland 24–27 Jun. 1997, which material is incorporated herein by reference.

In TMN8, the following parameters are calculated to make the INTRA/INTER decision:

$$MB\_mean = \left(\sum_{i=1,j=1}^{16,16} \text{original}(i, j)\right) / 256$$

$$A = \sum_{i=1,i=1}^{16,16} |\text{original}(i, j) - MB\_mean|$$

INTRA mode is chosen if A<B

Where, $$B = \sum_{i=1,j=1}^{16,16} |\text{original}(i, j) - \text{previous}(i, j)| - \beta$$

β={600 mv=0
{500 mv≠0

The parameter previous (i,j) corresponds to the best match block in the previous frame used for motion compensation, and mv is the motion vector.

Since the decoder does not have the original values, the term "original" has to be replaced by the term "reconstructed". The change from two-outcome to three-outcome case is achieved by considering an error margin E due to the problems discussed above:

INTRA mode if A<B−E
UNKNOWN if B−E<A<B+E
INTER mode if B+E<A

A mode change from INTER to INTRA (or vice versa) indicates that the current block is corrupted, and therefore appropriate error concealment techniques should be used, such as the one hereinbefore described.

Obviously, the value of E should be tuned depending on the system in use. It is a trade-off between the accuracy and rate of detection of the corruption blocks. If the decoder and encoder both employ the same method for mode selection, then a smaller E can be selected.

The difference between the original and decoded pixel values depending on the quantization parameter q. Therefore, E should be a function of q. This function should be determined by considering the quantizer. For the TMN8 quantizer, E value is defined as follows:

E={256 if q<4
{64q if q>=4

The invention claimed is:

1. A receiver, comprising a decoder for receiving encoded video signals,
   wherein the decoder is operative to decode said encoded video signals transmitted through air, and transmitted selectively in inter-frame prediction format wherein the signals represent differences between selected macroblocks in successive frames when a specific difference criterion between said successive macroblocks is not exceeded, the decoder also being operative to decode a transmitted through air mode indicator signal indicative of whether or not the last received macroblock was encoded in said inter-frame prediction format, frames comprising macroblocks;
   the receiver further comprising:
   a video signal error detection system comprising a first comparator for comparing macroblocks in successive frames output from said decoder and applying said specific difference criteria to provide an indication of whether inter-frame prediction should apply or not,
   and a second comparator for comparing the indication from the first comparator with said mode indicator signal,
   the second comparator being operative to generate an error signal when a divergence is detected.

2. A system according to claim 1, including an error concealment circuit responsive to the decoder and a previous frames buffer to recover corrupted data when the second comparator indicates an error.

3. A system according to claim 1, wherein the first comparator acts as a mode decision circuit capable of generating one of three outcomes namely, inter-frame prediction, no inter-frame prediction and unknown.

4. A system according to claim 3, wherein the mode decision circuit responds to each macroblock of each frame from the output from the decoder to determine a mean value for pixels and responds to a difference A between reconstructed values of pixels in said macroblock and said mean value, a difference B between the reconstructed values of pixels of a current macroblock and reconstructed values of pixels of a corresponding macroblock of an immediately preceding frame and an error margin E to provide a first outcome if A<B−E a second outcome if B−E<A<B+E and a third outcome if B+E<A.

5. A system according to claim 2, wherein the error concealment circuit acts to replace each corrupted macroblock with a corresponding macroblock in the immediately preceding frame.

6. A video signal error detection system for use in a receiver having a decoder for receiving encoded video signals produced by an encoder in a transmitter, wherein the encoder is selectively operative to transmit the differences only between selected macroblocks in successive frames when a specific difference criterion between said successive macroblocks is not exceeded,
   and wherein each frame comprises one or more macroblocks, the detection system comprising:
   a first comparator configured to compare macroblocks in successive frames in an output signal from said decoder, and to apply said specific difference criterion to provide an indication of whether or not inter-frame prediction should apply, and further configured to determine a mean value for pixels in response to each of said macroblocks; and
   a second comparator configured to compare the indication from the first comparator with an output from the decoder indicative of whether or not the last received macroblock was in inter-frame prediction format and operable to generate an error signal when a divergence is detected;
   wherein the first comparator comprises a mode decision circuit configured to respond to each macroblock of each frame from the output of the decoder by generating one of three possible outcomes namely, inter-frame prediction, no inter-frame prediction and unknown; and
   wherein, in the response to a current macroblock, said possible outcomes are conditioned on a difference A between reconstructed values of pixels in said current macroblock and the corresponding mean pixel value, a difference B between the reconstructed values of pixels of said current macroblock and reconstructed values of pixels of the corresponding macroblock of an immediately preceding frame, and an error margin E, thereby to provide a first of said possible outcomes if A<B−E, a second of said possible outcomes if B−E<A<B+E, and a third of said possible outcomes if B+E<A.

* * * * *